United States Patent
Helwig et al.

(10) Patent No.: US 10,627,073 B2
(45) Date of Patent: Apr. 21, 2020

(54) VEHICLE HEADLAMP DE-CONDENSATION

(71) Applicant: Ford Global Technologies, LLC, Dearborn, MI (US)

(72) Inventors: Stephen Kenneth Helwig, Farmington Hills, MI (US); David A. Brown, Plymouth, MI (US); Aaron Bradley Johnson, Allen Park, MI (US); Paul Kenneth Dellock, Northville, MI (US); Stuart C. Salter, White Lake, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 269 days.

(21) Appl. No.: 15/911,921

(22) Filed: Mar. 5, 2018

(65) Prior Publication Data
US 2019/0271449 A1 Sep. 5, 2019

(51) Int. Cl.
| | |
|---|---|
| *B01D 53/26* | (2006.01) |
| *F21S 45/33* | (2018.01) |
| *F21V 31/03* | (2006.01) |
| *F21S 45/37* | (2018.01) |
| *F21V 15/01* | (2006.01) |
| *F21V 29/74* | (2015.01) |

(Continued)

(52) U.S. Cl.
CPC ............ *F21S 45/33* (2018.01); *B01D 53/263* (2013.01); *F21S 45/37* (2018.01); *F21S 45/60* (2018.01); *F21V 15/01* (2013.01); *F21V 29/74* (2015.01); *F21V 29/83* (2015.01); *F21V 31/03* (2013.01); *F21S 41/141* (2018.01); *F21Y 2115/10* (2016.08)

(58) Field of Classification Search
CPC .... B01D 53/04; B01D 53/261; B01D 53/263; B01D 2253/106; B01D 2253/108; B01D 2259/4566; F21S 41/141; F21S 41/645; F21S 45/33; F21S 45/37; F21S 45/60; F21V 15/01; F21V 29/74; F21V 29/83; F21V 31/03; F21Y 2115/10
USPC ............... 96/112, 117.5, 121, 133, 146, 147; 362/507, 547
See application file for complete search history.

(56) References Cited

U.S. PATENT DOCUMENTS

| | | | | |
|---|---|---|---|---|
| 4,796,163 | A | * | 1/1989 | Dressler .................. F21S 45/33 362/547 |
| 4,809,144 | A | * | 2/1989 | Suzuki .................... F21S 45/33 362/547 |

(Continued)

FOREIGN PATENT DOCUMENTS

| | | | |
|---|---|---|---|
| CN | 204165009 U | * | 2/2015 |
| CN | 106641947 A | | 5/2017 |

OTHER PUBLICATIONS

Machine-generated English translation of CN 204165009 U, published Feb. 2015.*

*Primary Examiner* — Frank M Lawrence, Jr.
(74) *Attorney, Agent, or Firm* — Frank Lollo; Eversheds Sutherland (US) LLP (57) ABSTRACT

Method and apparatus are disclosed for vehicle headlamp de-condensation. An example exterior lamp of a vehicle includes a housing, a cover coupled to the housing to define a cavity, and a lamp assembly within the cavity. The lamp assembly includes an LED, a heat sink coupled to the LED that is configured to dissipate heat and define a chamber, desiccant located within the chamber to collect moisture from the cavity, and a vent fluidly coupled to the chamber to remove the moisture from the cavity.

20 Claims, 6 Drawing Sheets

(51) Int. Cl.
  *F21V 29/83* (2015.01)
  *F21S 45/60* (2018.01)
  F21Y 115/10 (2016.01)
  F21S 41/141 (2018.01)

(56) References Cited

U.S. PATENT DOCUMENTS

| | | | |
|---|---|---|---|
| 6,422,729 B1 * | 7/2002 | Rohrbach | F21S 48/335 |
| | | | 362/539 |
| 6,883,948 B2 | 4/2005 | VanDuyn et al. | |
| 7,217,314 B2 | 5/2007 | DeGuiseppi et al. | |
| 2002/0170437 A1 | 11/2002 | DeGuiseppi et al. | |
| 2005/0157514 A1 * | 7/2005 | Brinkmann | F21S 45/33 |
| | | | 362/547 |

* cited by examiner

VEHICLE HEADLAMP DE-CONDENSATION

TECHNICAL FIELD

The present disclosure generally relates to vehicle lamps and, more specifically, to vehicle exterior lamp de-condensation.

BACKGROUND

Generally, vehicles include headlamps to illuminate areas in front of the vehicles. Typically, a vehicle includes low-beam headlamps that are utilized to illuminate a side of a road along which the vehicle is travelling. Additionally, a vehicle typically includes high-beam headlamps that are utilized to illuminate a greater portion of the road (e.g., illuminates the side of the road along which the vehicle travels and a side of the road along which on-coming traffic travels).

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are shown for vehicle exterior lamp de-condensation. An example disclosed exterior lamp of a vehicle includes a housing, a cover coupled to the housing to define a cavity, and a lamp assembly within the cavity. The lamp assembly includes an LED, a heat sink coupled to the LED that is configured to dissipate heat and define a chamber, desiccant located within the chamber to collect moisture from the cavity, and a vent fluidly coupled to the chamber to remove the moisture from the cavity.

In some examples, the cover is transparent.

In some examples, the desiccant releases the moisture from the cavity through the vent when the desiccant is heated. In such examples, the desiccant is located within the chamber defined by the heat sink to enable the desiccant to be warmed by the heat collected by the heat sink. In some examples, the desiccant includes at least one of silica gel, indicating silica gel, molecular sieve, calcium oxide, and calcium sulfate.

In some examples, the lamp assembly further includes a printed circuit board and electronics of the printed circuit board. In such examples, the printed circuit board is coupled to the heat sink to enable the heat sink to dissipate the heat from the electronics. In some examples, the lamp assembly further includes a valve housing that at least partially encloses the desiccant within the chamber defined by the heat sink.

In some examples, the lamp assembly further includes a valve fluidly that is coupled to the chamber and transitions between a first position and a second position.

In some such examples, the valve defines a first pathway in the first position. In such examples, the first pathway fluidly couples the chamber and the cavity to enable the desiccant to collect the moisture from the cavity. In some such examples, the valve defines a second pathway in the second position. In such examples, the second pathway fluidly couples the chamber and the vent to enable the vent to remove the moisture collected by the desiccant. In some such examples, the lamp assembly further includes a membrane layer within the first pathway and the second pathway to retain the desiccant within the chamber.

In some such examples, the lamp assembly further includes a thermistor to determine a temperature within the chamber. In such examples, the valve is set in the first position when the temperature is less than a threshold temperature, and the valve is set in the second position when the temperature is greater than or equal to the threshold temperature. In some such examples, the thermistor directly measures the temperature within the chamber. In some such examples, the thermistor measures a second temperature of electronics of the lamp assembly and determines the temperature of the chamber based upon a predetermined relationship between the temperature of the chamber and the second temperature of the electronics.

Some examples further include a second lamp assembly adjacent the lamp assembly. In such examples, the second lamp assembly includes a second LED, a second heat sink, a second desiccant, and a second vent. In some such examples, the lamp assembly is a low-beam lamp assembly and the second lamp assembly is a high-beam lamp assembly.

An example disclosed vehicle includes a lamp including a cavity and a lamp assembly within the cavity. The lamp assembly includes a light emitting device, a heat sink coupled to the light emitting device that is configured to dissipate heat and define a chamber, desiccant located within the chamber to collect moisture from the cavity, and a vent fluidly coupled to the chamber to remove the moisture from the cavity.

In some examples, the lamp includes at least one of a headlamp, a tail lamp, and a turn signal lamp.

In some examples, the desiccant releases the moisture from the cavity when the desiccant heated. In such examples, the desiccant is located within the chamber defined by the heat sink to enable the desiccant to be warmed by the heat collected by the heat sink.

In some examples, the lamp assembly further includes a valve fluidly coupled to the chamber that transitions between a first position and a second position. In such examples, the valve defines a first pathway in the first position and a second pathway in the second position. Further, in such examples, the first pathway fluidly couples the chamber and the cavity to enable the desiccant to collect the moisture from the cavity, and the second pathway fluidly couples the chamber and the vent to enable the vent to remove the moisture collected by the desiccant. In some such examples, the lamp assembly further includes a thermistor to determine a temperature within the chamber. In such examples, the valve is set in the first position when the temperature is less than a threshold temperature and is set in the second position when the temperature is greater than or equal to the threshold temperature.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

Generally, vehicles include headlamps to illuminate areas in front of the vehicles. Typically, a vehicle includes low-beam headlamps that are utilized to illuminate a side of a road along which the vehicle is travelling. Additionally, a vehicle typically includes high-beam headlamps that are utilized to illuminate a greater portion of the road (e.g., illuminates the side of the road along which the vehicle travels and a side of the road along which on-coming traffic travels). Additionally, a vehicle typically includes other types of external lamps (e.g., tail lamps, turn signal lamps, etc.) and/or internal lamps (e.g., dome lamps, door strip lamps, etc.) for various illumination purposes. In some instances, moisture may collect within an interior of a vehicle lamp. For instance, moisture may collect within the interior of the vehicle lamp in humid conditions. In such instances, the moisture collected within the interior of the vehicle lamp potentially may reduce illumination provided by the vehicle lamp.

Example apparatus disclosed herein include desiccant housed within a heat sink for electronic components of a vehicle lamp (e.g., an internal lamp, an external lamp such as a headlamp, a tail lamp, a turn signal lamp, etc.) that collects moisture from a cavity of the vehicle lamp. As used herein, a "desiccant" refers to a hygroscopic substance or material, which attracts and holds water molecules from a surrounding area, to induce and/or maintain a state of dryness of the surrounding area. When the desiccant is warmed via heat collected by the heat sink, the moisture collected by the desiccant is removed from the vehicle lamp via a vent. By housing the desiccant within the heat sink that is used for dissipating heat generated by the electronic components of the vehicle lamp, the moisture is pumped out of the vehicle lamp without requiring additional hardware and electronics dedicated for housing and heating the desiccant.

Example lamps disclosed herein include desiccant, a valve, a vent, a temperature sensor, a light emitting device (e.g., an LED), other electronic components, and a heat sink for the electronic components within a cavity of the lamp. The desiccant is housed in a chamber defined by the heat sink, and the heat sink dries the desiccant when heated. When the temperature sensor detects that a temperature within the cavity is below a threshold, the valve is actuated to a first position to define a first passageway that enables the desiccant to absorb the moisture from the cavity of the lamp. When the temperature sensor detects that the temperature within the cavity is above the threshold, the valve is actuated to a second position to define a second passageway that enables the collected moisture to escape through the vent.

Figure 1:
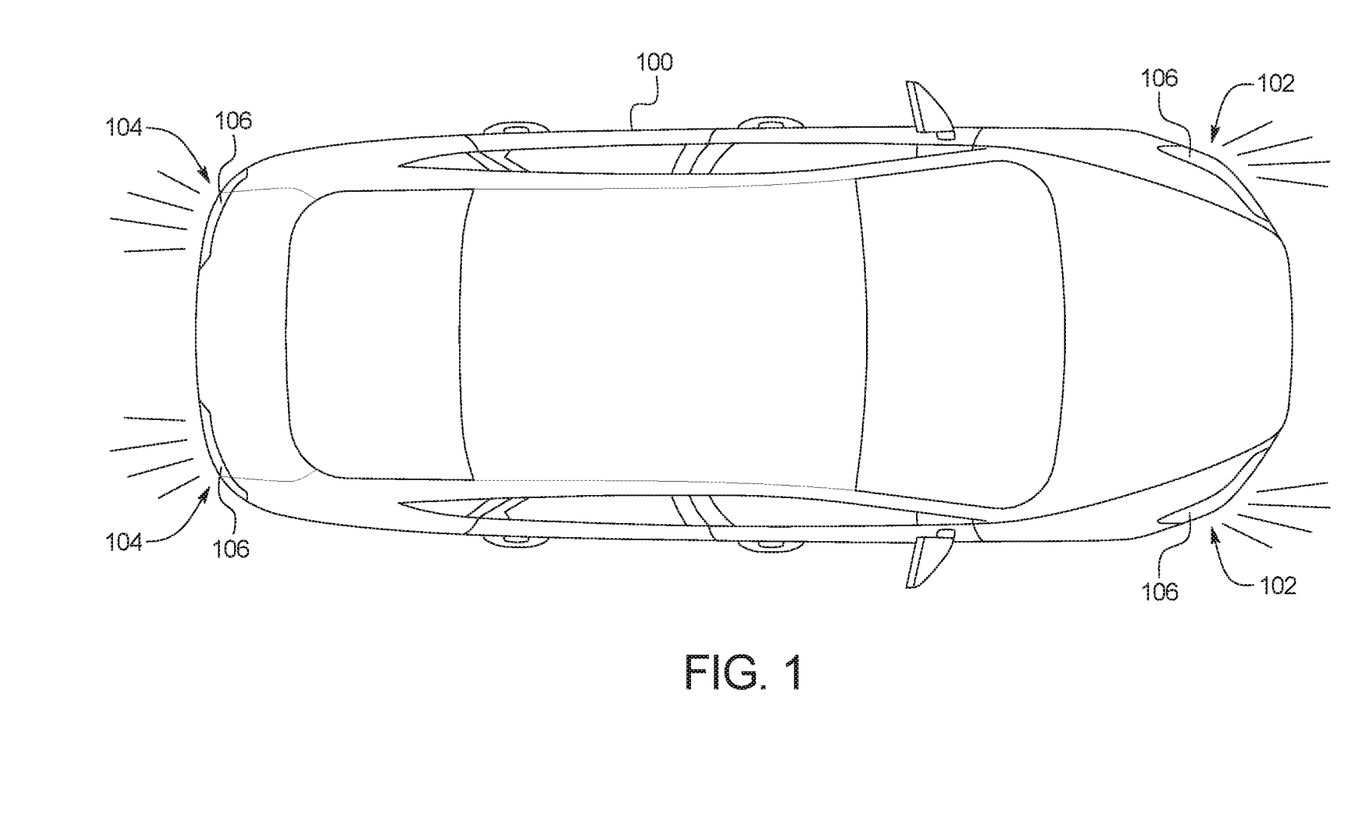
FIG. 1 illustrates an example vehicle in accordance with the teachings herein.

Turning to the figures, FIG. 1 illustrates an example vehicle 100 in accordance with the teachings herein. The vehicle 100 may be a standard gasoline powered vehicle, a hybrid vehicle, an electric vehicle, a fuel cell vehicle, and/or any other mobility implement type of vehicle. The vehicle 100 includes parts related to mobility, such as a powertrain with an engine, a transmission, a suspension, a driveshaft, and/or wheels, etc. The vehicle 100 may be non-autonomous, semi-autonomous (e.g., some routine motive functions controlled by the vehicle 100), or autonomous (e.g., motive functions are controlled by the vehicle 100 without direct driver input).

In the illustrated example, the vehicle 100 includes headlamps 102 at a front of the vehicle 100 and tail lamps 104 at a rear of the vehicle 100. Each of the headlamps 102 and the tail lamps 104 includes a housing (e.g., a housing 202 of FIG. 2) and a cover 106 coupled to the housing. The cover 106 of each of the headlamps 102 is transparent to enable light to be emitted from the headlamps 102. For example, the headlamps 102 are activated to light a portion of a road in front of the vehicle 100 to enable a vehicle operator to see in front of the vehicle 100 in low-light conditions. In some examples, each of the headlamps 102 includes a low-beam lamp and a high-beam lamp 108. For example, the low-beam headlamps are utilized to illuminate a side of a road along which the vehicle 100 is travelling, and the high-beam headlamps are utilized to illuminate a greater portion of the road. Further, the tail lamps 104 are activated to warn others when the vehicle 100 is braking.

In some examples, one or more of the headlamps 102 and/or the tail lamps 104 include a plurality of light-emitting diodes (LEDs). The LEDs may be fully illuminated, fully dimmed, and/or partially illuminated to produce a plurality of headlight settings for the vehicle 100. For example, the headlamps 102 may produce a low-beam setting when the low-beam lamps are fully illuminated and the high-beam lamps are fully dimmed. Conversely, the headlamps 102 may produce a high-beam setting when the high-beam lamps are fully illuminated.

Figure 2:
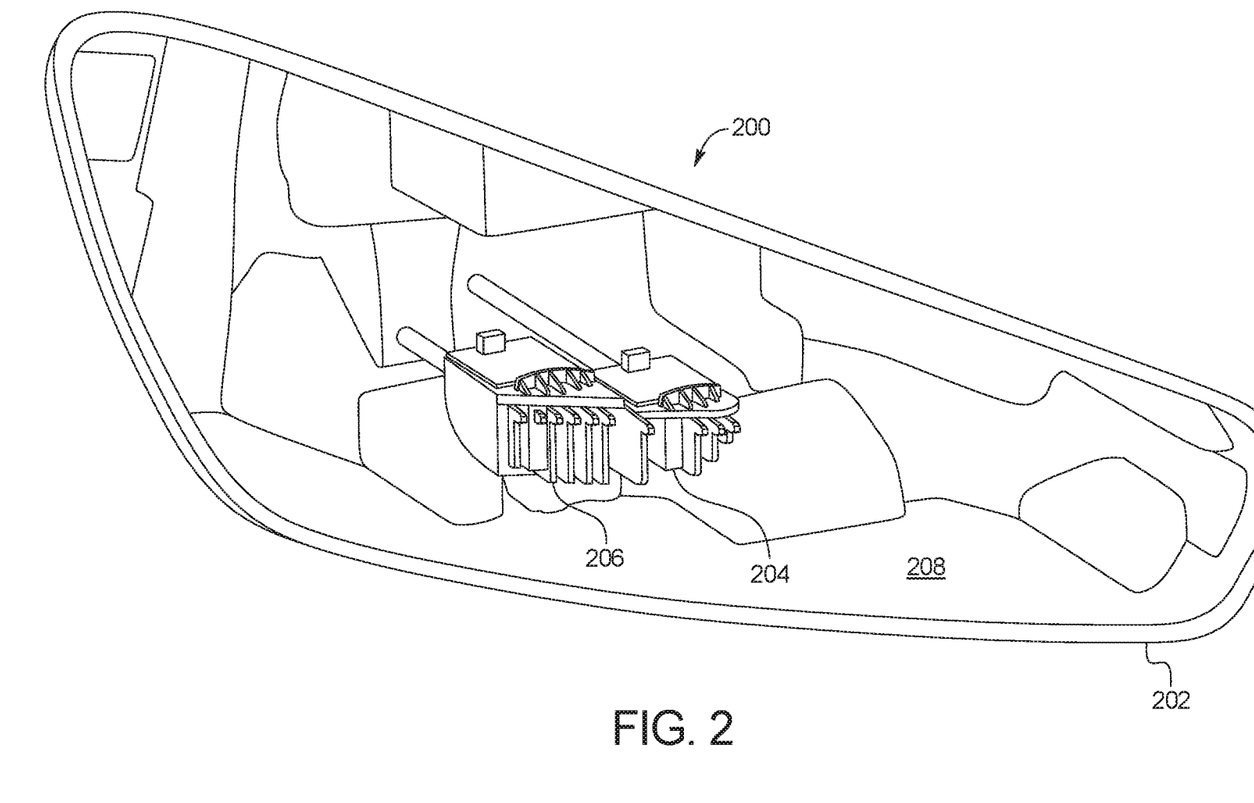
FIG. 2 is a cutaway view of an example headlamp of the vehicle of FIG. 1 that includes example lamp assemblies.

FIG. 2 is a cutaway view of an example lamp 200 in which a cover (e.g., the cover 106) is removed from a housing 202. The lamp 200 of the illustrated example is representative of each of the headlamps 102 of the vehicle 100. Further, the lamp 200 of the illustrated example includes the housing 202, the cover 106 coupled to the housing 202, a lamp assembly 204, another lamp assembly 206, and a cavity 208 defined by the housing 202 and the cover 106. As illustrated in FIG. 2, the lamp assembly 206 (e.g., a first lamp assembly, a low-beam lamp assembly) is adjacent to the lamp assembly 204 (e.g., a second lamp assembly, a high-beam lamp assembly) within the cavity 208.

Figure 3:
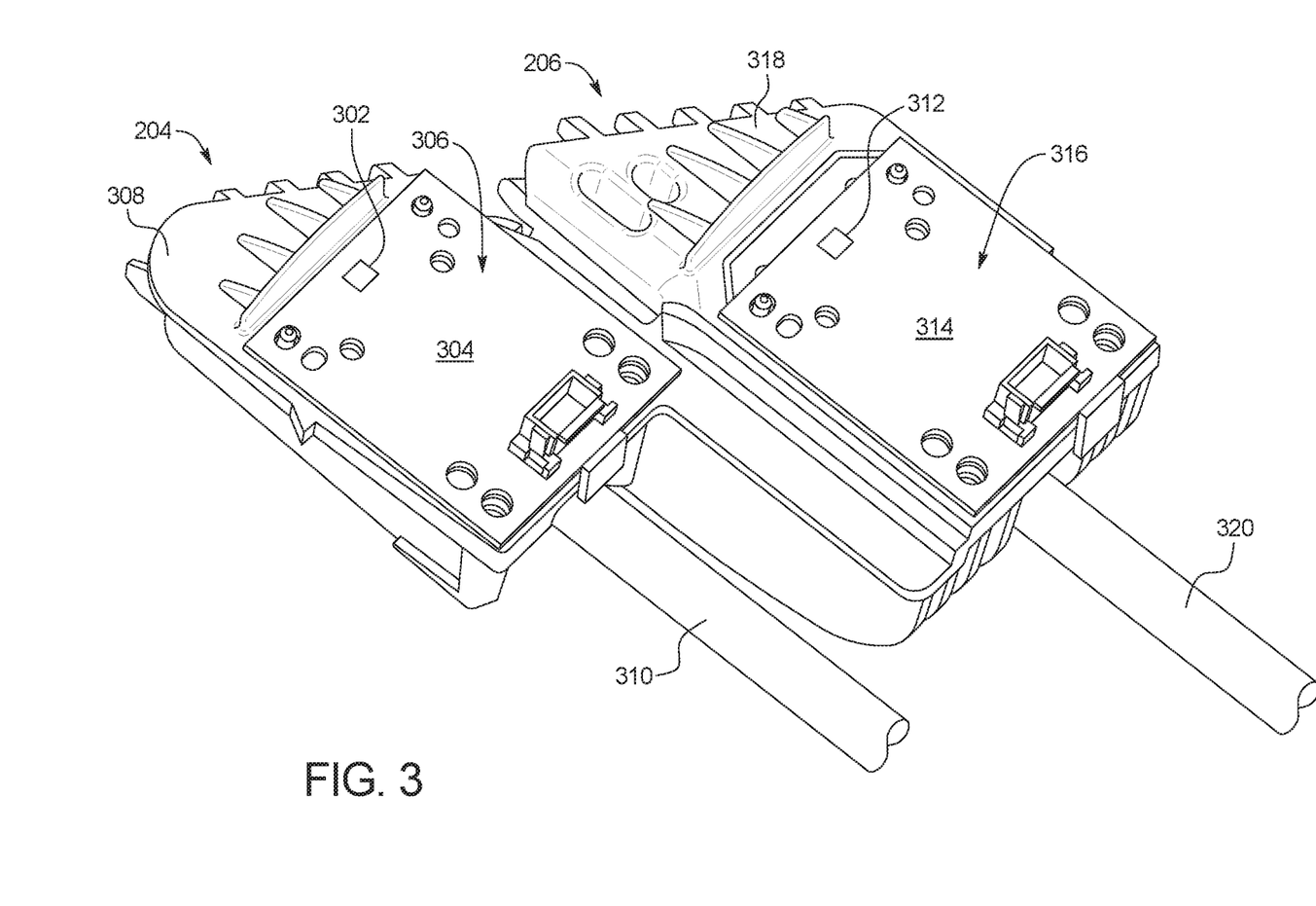
FIG. 3 illustrates the lamp assemblies of FIG. 2.

FIG. 3 further illustrates the lamp assembly 204 and the lamp assembly 206 of the lamp 200.

As illustrated in FIG. 3, the lamp assembly 204 includes a light emitting device 302, a printed circuit board 304, electronics 306, a heat sink 308, and a vent tube 310. In the illustrated example, the light emitting device 302 is a light emitting diode (LED). The light emitting device 302 is configured to emit light (e.g., low-beam light) that is transmitted through the cover 106 of the lamp 200 to enable the lamp 200 to illuminated an area in front of the vehicle 100. Additionally, the light emitting device 302 of the illustrated example is coupled to the printed circuit board 304. Further, the printed circuit board 304 includes the electronics 306 that are configured to enable operation of the light emitting device 302. During operation, the light emitting device 302, the electronics 306, and/or the printed circuit board 304 produce heat. For example, the light emitting device 302, the electronics 306, and/or the printed circuit board 304 may reach temperatures of about 150° C. when the light emitting device 302 is emitting light.

To prevent the generated heat from melting and/or otherwise damaging the light emitting device 302, the electronics 306, and/or the printed circuit board 304, the heat sink 308 collects the generated heat and dissipates the heat away from the light emitting device 302, the electronics 306, and the printed circuit board 304. In the illustrated example, the heat sink 308 is coupled to the light emitting device 302, the electronics 306, and the printed circuit board 304 to facilitate the heat sink 308 in the collecting the heat generated by the light emitting device 302, the electronics 306, and the printed circuit board 304.

Further, the lamp assembly 204 includes the vent tube 310. As disclosed in further detail below, the vent tube 310 provides a pathway for moisture that is collected by desiccant (e.g., desiccant 502 of FIGS. 5-7) within a chamber (e.g., a chamber 406 of FIGS. 4-7) of the heat sink 308 to be released through a vent (e.g., a vent 410 of FIGS. 4-7) of the lamp 200. In the illustrated example, the vent tube 310 is a hose and/or any other object that define a pathway from the chamber of the heat sink 308 to the corresponding vent.

Additionally, the lamp assembly 206 of the illustrated example includes a light emitting device 312, a printed circuit board 314, electronics 316, a heat sink 318, and a vent tube 320. The light emitting device 312 (e.g., an LED) is configured to emit light (e.g., high-beam light) that is transmitted through the cover 106 of the lamp 200 to enable the lamp 200 to illuminated an area in front of the vehicle 100. The light emitting device 312 is coupled to the printed circuit board 314. Further, the printed circuit board 314 includes the electronics 316 that are configured to enable operation of the light emitting device 312.

The heat sink 318 of the illustrated example is coupled to the light emitting device 312, the electronics 306, and the printed circuit board 314. The heat sink 318 collects and dissipates heat away from the light emitting device 312, the electronics 316, and the printed circuit board 314 to prevent the heat from melting and/or otherwise damaging the light emitting device 312, the electronics 316, and/or the printed circuit board 314. In the illustrated example, the heat sink 318 is integrally formed with the heat sink 308. In other examples, the heat sink 318 separately formed from the heat sink 308. In such examples, the heat sink 308 and the heat sink 318 may be spaced apart or coupled together.

Further, the lamp assembly 206 includes the vent tube 320. The vent tube 310 provides a pathway for moisture that is collected by desiccant within a chamber of the heat sink 318 to be released through a vent of the lamp 200. In the illustrated example, the vent tube 320 is a hose and/or any other object that define a pathway from the chamber of the heat sink 318 to the corresponding vent.

Figure 4:
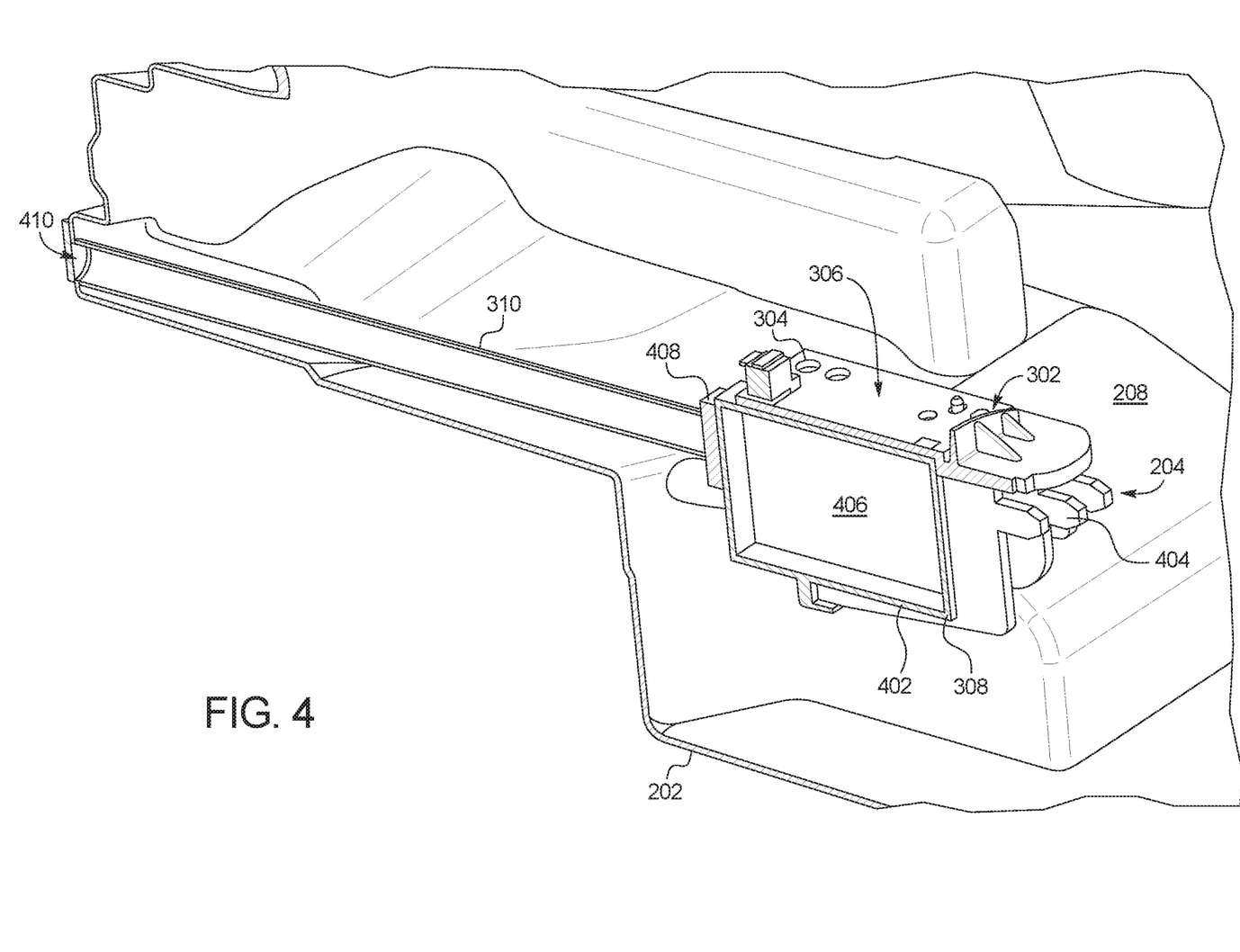
FIG. 4 is another cutaway view of the headlamp and the lamp assemblies of FIG. 2.

FIG. 4 is another cutaway view of the housing 202 and the lamp assembly 204 located within the cavity 208 of the lamp 200. As illustrated in FIG. 4, the lamp assembly 204 includes the light emitting device 302, the printed circuit board 304, the electronics 306, the heat sink 308, and the vent tube 310. The heat sink 308 of the illustrated example includes a body 402 and fins 404. The fins 404 that protrude from the body 402 to facilitate the heat sink 308 in dissipating heat away from the light emitting device 302, the printed circuit board 304, and/or the electronics 306. Further, the body 402 of the heat sink 308 defines a chamber 406. As disclosed in further detail below, the chamber 406 (also referred to as a desiccant chamber or a heat sink chamber) houses desiccant (e.g. desiccant 502 of FIGS. 5-7) that collects moisture from the cavity 208 of the lamp 200.

Further, the lamp assembly 204 of the illustrated example includes a valve housing 408 and a vent 410. The valve housing 408 is coupled to the heat sink 308 and at least partially encloses the desiccant within the chamber 406 defined by the heat sink 308. Further, as disclosed below in further detail, the valve housing 408 houses a valve (e.g., a valve 602 of FIGS. 6-7) that controls flow of moisture into and from the chamber 406 of the heat sink 308. The vent 410 of the illustrated example is configured to remove moisture collected by the desiccant from the lamp 200. For example, the vent 410 is fluidly coupled to the chamber 406 of the heat sink 308 via the vent tube 310 and the valve within the valve housing 408.

Figure 5:
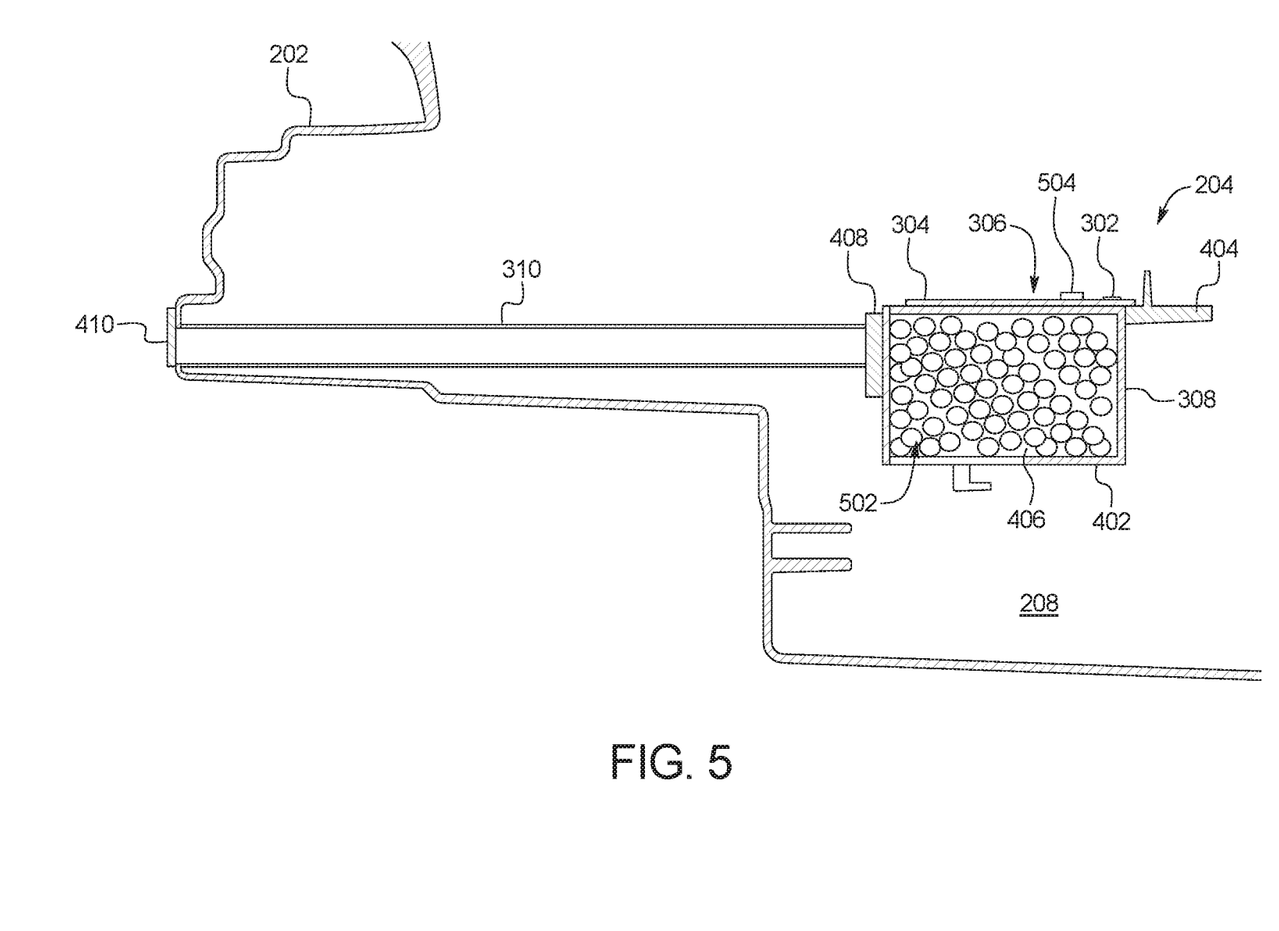
FIG. 5 is a cross-sectional view of the headlamp and one of the lamp assemblies of FIG. 2.

FIG. 5 is a cross-sectional view of the housing 202 and the lamp assembly 204 located within the cavity 208 of the lamp 200. In the illustrated example, the lamp assembly 204 includes the light emitting device 302, the printed circuit board 304, the electronics 306, the heat sink 308 the vent tube 310, the valve housing 408, and the vent 410. Further, the heat sink 308 includes the body 402, the fins 404 protruding from the body 402, and the chamber 406 defined by the body 402.

As illustrated in FIG. 5, desiccant 502 is located within the chamber 406 of the heat sink 308. For example, the desiccant 502 includes silica gel, indicating silica gel, molecular sieve, calcium oxide, calcium sulfate and/or any other hygroscopic substance or material that is configured to collect moisture from within the cavity 208 of the lamp 200. The desiccant 502 is configured to (i) absorb moisture when the desiccant 502 is less than a threshold temperature (e.g., between about 70° C. and 130° C.) and (ii) desorb moisture when the desiccant 502 is greater than or equal to the threshold temperature.

In operation, the desiccant 502 (i) absorbs moisture from the cavity 208 of the lamp 200 when the desiccant 502 is less than the threshold temperature and (ii) desorbs the moisture from the lamp 200 through the vent 410 when the desiccant 502 is greater than or equal to the threshold temperature. For example, a valve within the valve housing 408 (e.g., a valve 602 of FIGS. 6-7) defines an entry passageway (e.g., a first pathway 604 of FIG. 6) when the desiccant temperature is less than the threshold temperature that enables the desiccant 502 to collect the moisture from the cavity 208 of the lamp 200. For example, the desiccant temperature may be less than the threshold temperature when the lamp 200 is active and/or inactive. Further, the valve defines an exit passageway when the desiccant temperature is greater than or equal to the threshold temperature that enables the desiccant 502 to release the moisture from the lamp 200 through the vent 410. For example, the desiccant temperature may be greater than or equal to the threshold temperature when the lamp 200 is active and/or inactive.

The desiccant 502 is located within the chamber 406 defined by the heat sink 308 to enable the desiccant 502 to be warmed by heat collected by the heat sink 308, for example, from the light emitting device 302, the printed circuit board 304, and/or the electronics. By housing the desiccant 502 within the chamber 406 of the heat sink 308 that dissipates heat generated by the light emitting device 302, the printed circuit board 304, and/or the electronics 306, moisture is pumped from the lamp 200 without requiring additional hardware and electronics dedicated for housing and heating the desiccant 502. Thus, the moisture removal system of the illustrated example effectively removes moisture form the lamp 200 in an energy-efficient manner.

In the illustrated example, the valve within the valve housing 408 transitions between a position that defines the entry passageway (e.g., a first position) and a position that defines the exit passageway (e.g., a second position) based upon the temperature of the desiccant 502 that is measured by a thermistor 504. That is, the lamp assembly 204 includes the thermistor 504 that determines the temperature within the chamber 406 of the heat sink 308. For example, the electronics 306 of the printed circuit board 304 include the thermistor 504. In some examples, the thermistor 504 directly measures the temperature of the desiccant 502 within the chamber 406 of the heat sink 308. In other examples, the thermistor 504 directly measures a temperature of the light emitting device 302, the printed circuit board 304, and/or the electronics 306. In such examples, the temperature of the desiccant 502 within the chamber 406 is determined based upon a predetermined relationship (e.g., a ratio, a linear relationship, a non-linear relationship, etc.) between the temperature of the desiccant 502 within the chamber 406 and the measured temperature of the light emitting device 302, the printed circuit board 304, and/or the electronics 306.

Figure 6:
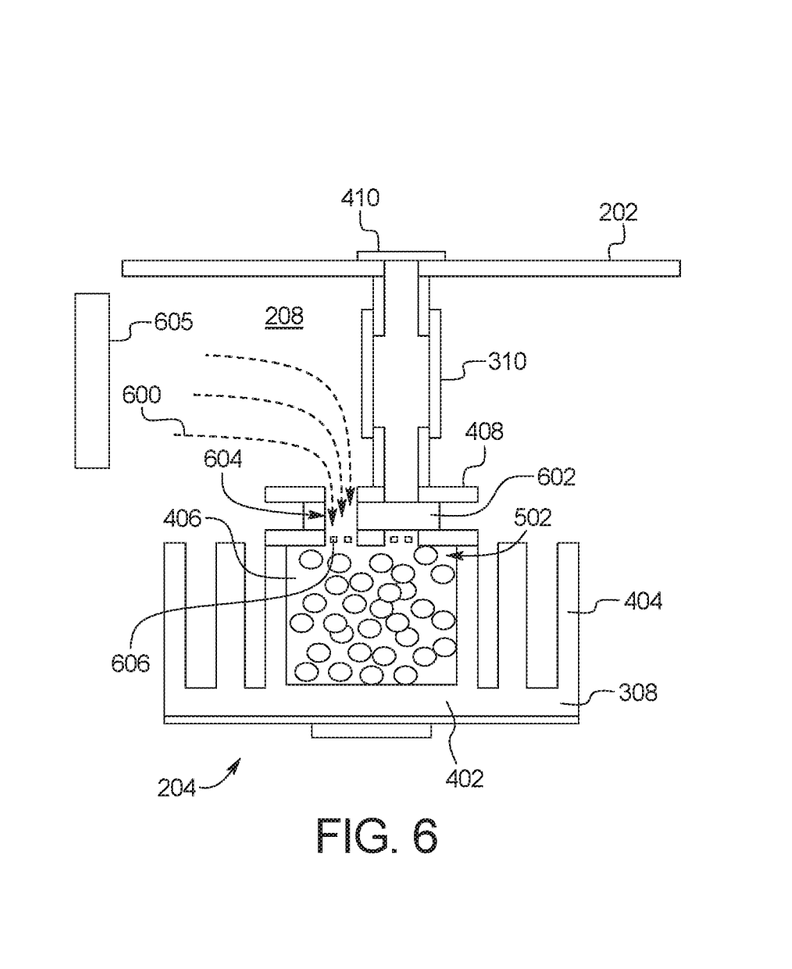
FIG. 6 depicts a schematic of one of the lamp assemblies of FIG. 2 in a first state.
Figure 7:
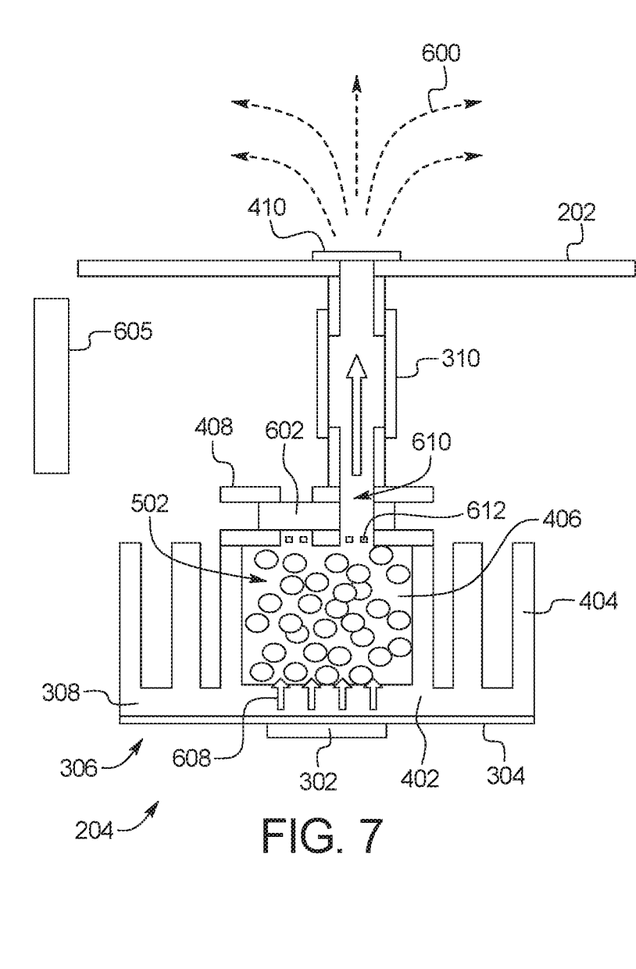
FIG. 7 depicts a schematic of one of the lamp assemblies of FIG. 2 in a second state.

FIGS. 6-7 depicts schematics of the lamp assembly 204 in operation. More specifically, FIG. 6 the lamp assembly 204 in a first state, and FIG. 7 depicts the lamp assembly 204 in a second state. As illustrated in FIGS. 6-7, the lamp assembly 204 is configured to remove moisture 600 from the cavity 208 of the lamp 200 to outside the housing 202 of the lamp 200. In the illustrated example, the lamp assembly 204 includes the light emitting device 302, the printed circuit board 304, the electronics 306, the heat sink 308 the vent tube 310, the valve housing 408, and the vent 410. The heat sink 308 includes the body 402, the fins 404 protruding from the body 402, and the chamber 406 defined by the body 402. Further, the valve housing 408 of the illustrated example houses a valve 602 that transitions between a first position (FIG. 6) and a second position (FIG. 7). The valve 602 (e.g., a momentary electromechanical valve, a passive valve, a bimetallic activation valve, etc.) is fluidly coupled to the chamber 406 of the heat sink 308 to control flow of moisture into and out of the chamber 406.

As illustrated in FIG. 6, the valve 602 is in the first position when the lamp assembly 204 is in the first state. In the first position, the valve 602 defines a first pathway 604 that fluidly couples the chamber 406 of the heat sink 308 to the cavity 208 of the lamp 200. The first pathway 604 enables the desiccant 502 to collect the moisture 600 from the cavity 208. That is, when the valve 602 defines the first pathway 604, the moisture 600 within the cavity 208 of the lamp 200 flows through the first pathway 604 into the chamber 406 and is collected by the desiccant 502 within the chamber 406. Further, the valve 602 of the illustrated example is set in the first position when the thermistor 504 detects that the desiccant temperature is less than the threshold temperature to enable the desiccant 502 to collect the moisture 600 from the cavity 208 through the first pathway 604. In the illustrated example, the lamp assembly 204 also includes a fan 605 that is configured to increase the efficiency at which the moisture 600 and heat from is removed from the cavity 208 of the lamp 200.

In the illustrated example, the lamp assembly 204 also includes a membrane layer 606 that is located within and/or adjacent the first pathway 604. The membrane layer 606 is configured to prevent the desiccant 502 from traversing through the first pathway 604 and, thus, retain the desiccant 502 within the chamber 406 of the heat sink 308.

As illustrated in FIG. 7, the valve 602 is in the second position when the lamp assembly 204 is in the second state. The valve 602 of the illustrated example is set in the second position when the thermistor 504 detects that the desiccant temperature is greater than or equal to the threshold temperature. Further, the valve 602 of the illustrated example transitions from the first position to the second position to transition the lamp assembly 204 from the first state to the second state in response to the thermistor 504 detecting that the desiccant temperature has become greater than or equal to the threshold temperature. For example, the desiccant temperature become greater than or equal to the threshold temperature when heat 608 is generated by the light emitting device 302, the printed circuit board 304, and/or the electronics 306 and collected by the heat sink 308 that defines the chamber 406 in which the desiccant 502 is housed. Conversely, the valve 602 transitions from the second position to the first position to transition the lamp assembly 204 from the second state to the first state in response to the thermistor 504 detecting that the desiccant temperature has become less than the threshold temperature. For example, the desiccant temperature become less than the threshold temperature when the light emitting device 302, the printed circuit board 304, and/or the electronics 306 stop generating and the heat sink 308 stops collecting the heat 608.

In the second position, the valve 602 defines a second pathway 610 that fluidly couples the chamber 406 of the heat sink 308 to the vent 410 via the vent tube 320. The second pathway 610 enables the desiccant 502 to release the moisture 600 from the cavity 208 of the lamp 200 through the vent 410 when the desiccant is heated to a temperature greater than or equal to the threshold temperature. That is, the moisture 600 collected by the desiccant 502 is removed from the cavity 208 of the lamp 200 via the vent 410 when the desiccant temperature is greater than or equal to the threshold temperature. In other words, when the valve 602 defines the second pathway 610, the moisture 600 captured by the desiccant 502 is released and flows through the second pathway 610, the vent tube 320, and the vent 410 to be removed from the lamp 200.

The lamp assembly 204 of the illustrated example also includes a membrane layer 612 that is located within and/or adjacent the second pathway 610. The membrane layer 612 is configured to prevent the desiccant 502 from traversing through the second pathway 610 and, thus, retain the desiccant 502 within the chamber 406 of the heat sink 308. The membrane layer 612 may be integrally formed with or separately formed relative to the membrane layer 606.

While FIGS. 4-7 disclose a moisture removal system of the lamp assembly 204, the lamp assembly 206 of FIGS. 2-3 includes a moisture removal system that is substantially similar and/or identical to that of the lamp assembly 204. The moisture removal system of the lamp assembly 206 includes components that are identical or substantially similar to those of the moisture removal system of the lamp assembly 204. For example, the lamp assembly 206 includes desiccant, a heat sink chamber, a vent, a valve, and a vent body that are identical or substantially similar to the desiccant 502, the chamber 406, the vent 410, the valve 602, and the valve housing 408, respectively, of the lamp assembly 204 as disclosed in FIGS. 4-7.

Further, any other external lamp (e.g., one of the tail lamps 104, a turn signal lamp, etc.) and/or internal lamp (e.g., a dome lamp, etc.) of a vehicle (e.g., the vehicle 100) and/or another device is configurable to include a moisture removal system that is substantially similar and/or identical to that of the lamp assembly 204. Such moisture removal system(s) include components that are identical or substantially similar to those of the moisture removal system of the lamp assembly 204 as disclosed in FIGS. 4-7.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. An exterior lamp of a vehicle, comprising:
    a housing;
    a cover coupled to the housing to define a cavity; and
    a lamp assembly within the cavity that includes:
        an LED;
        a heat sink coupled to the LED that is configured to dissipate heat and define a chamber;
        desiccant located within the chamber to collect moisture from the cavity; and
        a vent fluidly coupled to the chamber to remove the moisture from the cavity.

2. The exterior lamp of claim 1, wherein the cover is transparent.

3. The exterior lamp of claim 1, wherein the desiccant releases the moisture from the cavity through the vent when the desiccant is heated, the desiccant is located within the chamber defined by the heat sink to enable the desiccant to be warmed by the heat collected by the heat sink.

4. The exterior lamp of claim 1, wherein the desiccant includes at least one of silica gel, indicating silica gel, molecular sieve, calcium oxide, and calcium sulfate.

5. The exterior lamp of claim 1, wherein the lamp assembly further includes a printed circuit board and electronics of the printed circuit board, the printed circuit board is coupled to the heat sink to enable the heat sink to dissipate the heat from the electronics.

6. The exterior lamp of claim 1, wherein the lamp assembly further includes a valve housing that at least partially encloses the desiccant within the chamber defined by the heat sink.

7. The exterior lamp of claim 1, wherein the lamp assembly further includes a valve fluidly that is coupled to the chamber and transitions between a first position and a second position.

8. The exterior lamp of claim 7, wherein the valve defines a first pathway in the first position, the first pathway fluidly couples the chamber and the cavity to enable the desiccant to collect the moisture from the cavity.

9. The exterior lamp of claim 8, wherein the valve defines a second pathway in the second position, the second pathway fluidly couples the chamber and the vent to enable the vent to remove the moisture collected by the desiccant.

10. The exterior lamp of claim 9, wherein the lamp assembly further includes a membrane layer within the first pathway and the second pathway to retain the desiccant within the chamber.

11. The exterior lamp of claim 7, wherein the lamp assembly further includes a thermistor to determine a temperature within the chamber, the valve is set in the first position when the temperature is less than a threshold temperature, the valve is set in the second position when the temperature is greater than or equal to the threshold temperature.

12. The exterior lamp of claim 11, wherein the thermistor directly measures the temperature within the chamber.

13. The exterior lamp of claim 11, wherein the thermistor measures a second temperature of electronics of the lamp assembly and determines the temperature of the chamber based upon a predetermined relationship between the temperature of the chamber and the second temperature of the electronics.

14. The exterior lamp of claim 1, further including a second lamp assembly adjacent the lamp assembly, the second lamp assembly includes a second LED, a second heat sink, a second desiccant, and a second vent.

15. The exterior lamp of claim 14, wherein the lamp assembly is a low-beam lamp assembly and the second lamp assembly is a high-beam lamp assembly.

16. A vehicle comprising:
    a lamp including a cavity;
    a lamp assembly within the cavity that includes:
        a light emitting device;
        a heat sink coupled to the light emitting device that is configured to dissipate heat and define a chamber;
        desiccant located within the chamber to collect moisture from the cavity; and
        a vent fluidly coupled to the chamber to remove the moisture from the cavity.

17. The vehicle of claim 16, wherein the lamp includes at least one of a headlamp, a tail lamp, and a turn signal lamp.

18. The vehicle of claim 16, wherein the desiccant releases the moisture from the cavity when the desiccant heated, the desiccant is located within the chamber defined by the heat sink to enable the desiccant to be warmed by the heat collected by the heat sink.

19. The vehicle of claim 16, wherein the lamp assembly further includes a valve fluidly coupled to the chamber that transitions between a first position and a second position, the valve defines a first pathway in the first position and a second pathway in the second position, the first pathway fluidly couples the chamber and the cavity to enable the desiccant to collect the moisture from the cavity, the second pathway fluidly couples the chamber and the vent to enable the vent to remove the moisture collected by the desiccant.

20. The vehicle of claim 19, wherein the lamp assembly further includes a thermistor to determine a temperature within the chamber, the valve is set in the first position when the temperature is less than a threshold temperature and is set in the second position when the temperature is greater than or equal to the threshold temperature.

* * * * *